United States Patent

Bagge et al.

[15] 3,704,897
[45] Dec. 5, 1972

[54] COMBINDED STEERING AND ROLL STABILIZING MEANS FOR VEHICLES

[72] Inventors: Walter Bagge, 837 East Almond Avenue, Orange, Calif. 92667; George F. Bagge, 3500 West Manchester Blvd., No. 298, Inglewood, Calif. 90305; Wilbur J. Hank, 1861 Omega Drive, Santa Ana, Calif. 92705

[22] Filed: Oct. 9, 1970

[21] Appl. No.: 79,534

[52] U.S. Cl. ................. 280/91, 280/96, 280/112 A, 280/263
[51] Int. Cl. ................................................ B62d 3/02
[58] Field of Search .......... 280/80, 87, 93, 95, 96, 91, 280/263, 112 A, 100

[56] References Cited

UNITED STATES PATENTS

| | | | |
|---|---|---|---|
| 2,038,843 | 4/1936 | Jones | 180/27 |
| 2,260,102 | 10/1941 | Freret | 280/87 R X |
| 2,458,400 | 1/1949 | Milliken | 180/41 |
| 1,243,317 | 10/1917 | McKenzie | 280/96 |
| 3,237,961 | 3/1966 | McMullen | 280/263 X |
| 776,078 | 11/1904 | Murphy | 280/112 A |
| 2,696,387 | 12/1954 | Nordin | 280/87 R X |
| 1,353,393 | 9/1920 | Haupt | 180/41 |
| 1,984,978 | 12/1934 | Moffitt | 280/112 R |

*Primary Examiner*—Benjamin Hersh
*Assistant Examiner*—John P. Silverstrim
*Attorney*—Perry E. Turner

[57] ABSTRACT

A vehicle is shown with spaced pairs of coaxial torque rods at right angles to its longitudinal axis and located forwardly of the front wheels and rear wheels. The outer ends of the front rods carry respective arms connected to the front wheels, and the outer ends of the other rods carry arms that are connected to the rear wheels. The opposed ends of each pair of rods carry segment gears which mesh with respective gears of a gear box. For the front wheels, the torque rods are operated through the gear box from the steering wheel. The torque rods for the back wheels are operable via arms that are linked by a rod and which are operatively connected to the respective gear boxes. When the steering wheel is turned so the vehicle negotiates a curve, the torque rods are operated in directions to tilt or lean the chassis and wheels inwardly so as to offset the outward sway and leaning that occurs due to the centrifugal force. The angle of the turn is controlled through the front gear box via a shaft connected to one of the gears and to which are connected the inner ends of steering rod links. The weight of the vehicle is distributed on all four wheels at all times.

3 Claims, 5 Drawing Figures

INVENTORS
WALTER BAGGE
GEORGE F. BAGGE
WILBUR J. HANK

BY Perry E. Turner
ATTORNEY

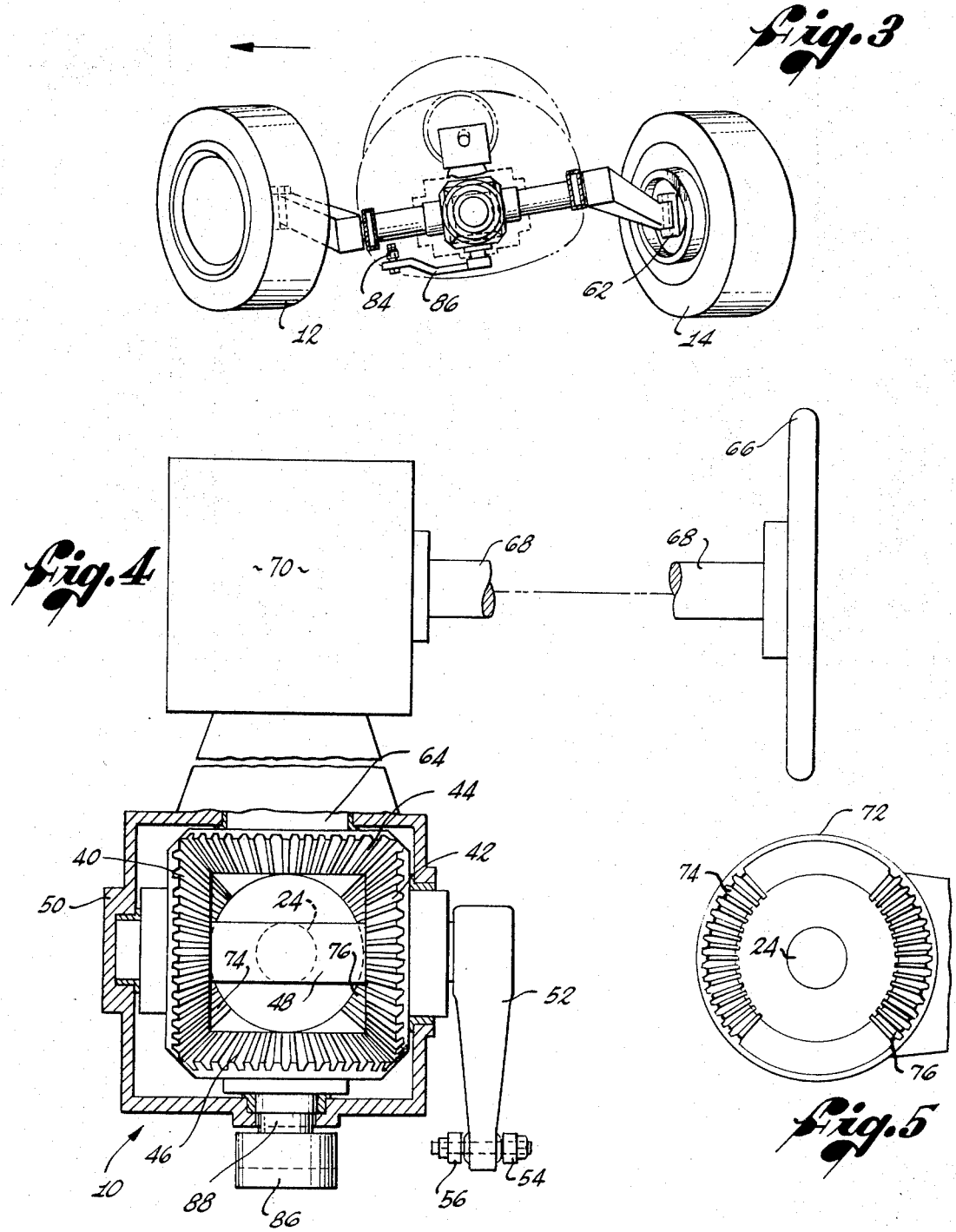

COMBINDED STEERING AND ROLL STABILIZING MEANS FOR VEHICLES

BACKGROUND OF THE INVENTION

1. Field of the Invention

This invention relates to automobile stabilizing means for minimizing the tendency of a vehicle to roll or tilt when negotiating a turn.

2. Description of the Prior Art

It has long been known that when a vehicle is negotiating a turn, the coincident centrifugal force results in an outward swaying or rolling tendency wherein there is greater traction of the outer wheels with the roadbed, and the inner wheels tend to lift away from the roadbed. Further, it is the outermost portions of the tires of the outer wheels that have the greater traction with the roadbed. The vehicle body, of course, also sways and tends to tilt outwardly. And in a sufficiently sharp turn at an unsafe speed, the vehicle will roll over unless the frictional engagement of the outer wheels with the roadbed is overcome, in which case the vehicle skids out of control. The undesirable consequence, of course, is a considerable loss of and danger to life and property.

Efforts have heretofore been made to provide means by which to keep a vehicle from tilting, rolling or skidding during a turn. Such efforts as known, however, rely on rather complex arrangements of torque springs or rods which extend longitudinally of the vehicle body, and which are operated to exert lifting forces on the outer wheels and downward forces on the inner wheels. In one arrangement, two parallel rods extend longitudinally of the vehicles, each being coupled at its ends to a rear wheel and a front wheel, and elaborate hydraulic or mechanical linkages are employed whereby rotation of the steering column effectively torques the rod connected to the inner wheels in a direction to increase the loading on the inner wheels, and torques the outer rod in a direction to relieve loading on the outer wheels. In another arrangement, each of these rods is split, and their adjacent ends are mechanically linked and operable via hydraulic and/or spring means to increase and decrease loading, respectively, on the inner and outer wheels.

SUMMARY OF THE INVENTION

This invention embraces a compact arrangement of short, coaxial torque rods at right angles to the vehicle body and connected via arms to the steered wheels, and gear means between the rods operable by the steering wheel to effect inward tilting of the vehicle body and the wheels during a turn. This invention also embraces a similar arrangement of torque rods and gear means for the remaining wheels, and a linkage between the gear means establishing inward tilting forces of all four wheels and both ends of the chassis. Outward tilting in thus counterbalanced, and the vehicle negotiates turns with all wheels having the same loading on the road.

BRIEF DESCRIPTION OF THE DRAWINGS

FIG. 3 is a sectional view taken along the line 3—3 of FIG. 1, showing the effects of the stabilizing forces created by the invention when the vehicle is being steered through a turn;

FIG. 4 is a view in elevation, and partly in section, taken along the line 4—4 of FIG. 1; and FIG. 5 is a view of the end of one of the torque rods, showing the segment gear teeth arrangements thereon to effect its operation when the steering wheel is turned.

DESCRIPTION OF ILLUSTRATIVE EMBODIMENT

Figure 1:
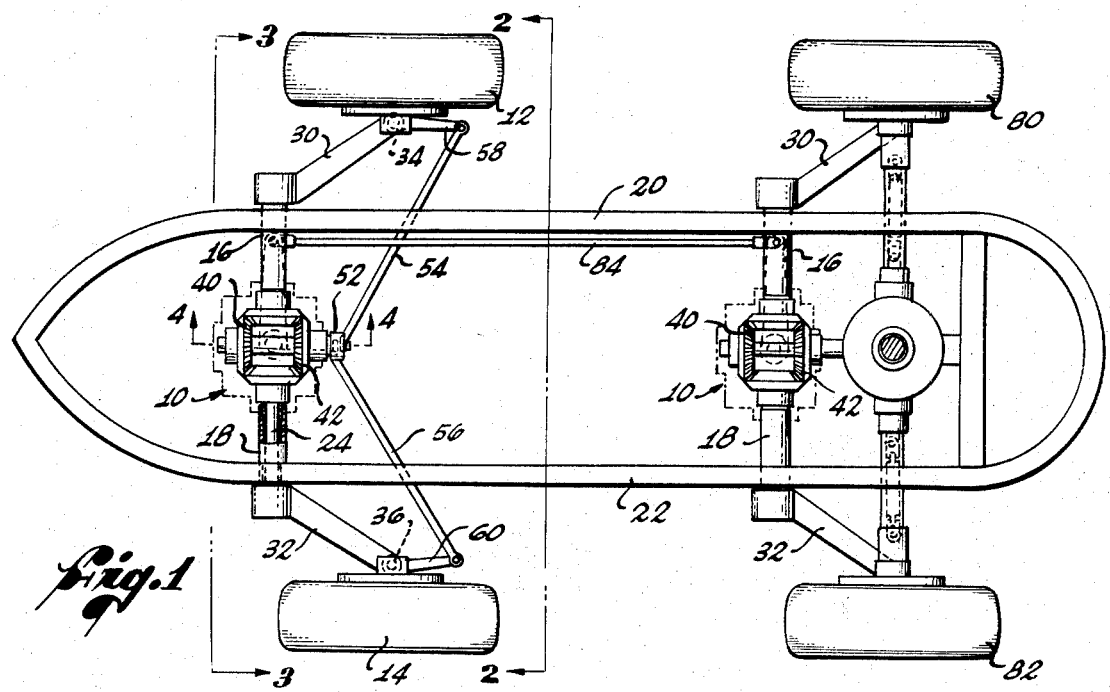
FIG. 1 is a top plan view of a vehicle frame and wheel structure with stablilizing means in accordance with this invention.
Figure 2:
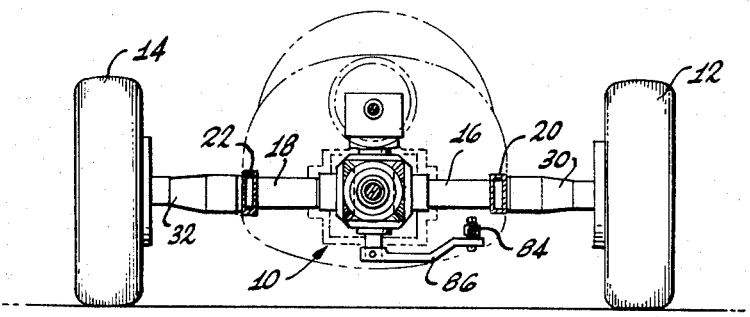
FIG. 2 is a sectional view taken along the line 2—2 of FIG. 1.

Referring to FIGS. 1 and 2, a gear box 10 is shown forwardly of the axes of the front wheels 12, 14, and coaxial sleeves 16, 18 extend from the sides of the gear box and through the side bars 20, 22 of the vehicle frame. The sleeves 16, 18 are secured in the frame, and support respective torque rods therein. The torque rods are identical, and sleeve 18 is broken away to show the torque rod 24 therein. Secured to the outer ends of the torque rods are arms 30, 32 which extend rearwardly to the wheels 12, 14 where the ends of the arms are held in place, as on king pins 34, 36.

Referring to FIGS. 4 and 5 along with FIGS. 1 and 2, the gear box 10 is shown comprised of two pairs of spur gears on mutually perpendicular axes, which in this arrangement are indicated as gears 40, 42 on a horizontal axis, and gears 44, 46 on a vertical axis. The gear 40 is secured to a shaft 48 which is journaled at its ends in the gear box housing 50, and which at one end is secured to an arm 52. Pivotally connected to the lower end of the arm 52 are the ends of steering rod links 54, 56, the outer ends of which are linked at 58, 60 to the castings 62 in which the ends of the king pins are secured.

The gear 42 is not secured to the shaft 48, but is slidably mounted thereon. Accordingly, rotation of the gear 44 effects rotation of the gears 40, 42 in opposite directions, and, via gears 40, 42 the gear 46 is rotated in a direction opposite to that of gear 44. Simultaneously, the arm 52 is rotated to the right or left, depending upon the direction of rotation of the gear 44, to effect the desired angular movements of the wheels 12, 14 for steering the vehicle.

The gear 44 is secured on a shaft 64, rotation of which is effected by the steering wheel 66. In this connection, the steering wheel shaft 68 is suitably arranged to drive the gear shaft 64, and to this end the shaft 68 is shown connected to a housing 70 which may include conventional right-angle gears to the shafts 64, 68, or conventional power-assisted gearing coupling the two shafts.

The inner ends of the torque rods are provided with opposed segment gears which mesh with the gears 40, 42. To this end, and referring to FIGS. 4 and 5, the inner end of the torque rod 24 carries a gear 72 which has opposed segments 74, 76 for meshing engagement with the gears 40, 42. As will be seen by inspection of the drawings, rotation of the gear 44 results in the oppositely moved gears 40, 42 cooperatively acting on the segments 74, 76 to exert torque on the rod 24 in the clockwise or counterclockwise direction, depending upon the rotation of the gear 44.

Further, the coaxial rods 24 are torqued in opposite directions when the steering wheel is turned, so that the inner rod urges the frame downwardly and the outer rod urges the frame upwardly. The wheels 12, 14 and arms 30, 32 are utilized to effect the tilting action. In this connection, it should be noted that since each arm is effectively attached at one end to the frame (via the torque rod), the weight on the wheel is a downward force that is greater than the downward and upward forces exerted on the other ends of the arms by the inner and outer torque rods. Accordingly, the other ends of the arms move to accommodate to downward and upward forces exerted on them by the torque rods. Therefore, a turn is made in a manner analogous to banking a motorcycle to negotiate a turn. In a four-wheel vehicle, the wheels bank or tilt inwardly with the tilting of the frame, and the total weight is distributed on all four wheels at all times.

This invention also embraces such stabilization means for both sets of wheels operable from the steering wheel. In FIG. 1, the rear wheels 80, 82 are provided with stabilizing means like that above described, and the corresponding parts are shown with the same numbers. Operation of the rear arms 30, 32 is effected in synchronism with the front arms 30, 32. This is done in the arrangement shown through an elongated rod 84 which is pivotally linked at its ends to arms 86 that are secured to the bottom gears 46 in the gear boxes. As best seen in FIG. 4, the bottom gear is carried on a shaft 88 that is rotatable in the bottom of the housing 50, and the end of the arm 86 is secured to the lower end of the shaft 86.

With this arrangement, rotational movement of the bottom gear of the front gear box results in longitudinal movement of the rod 84, which will be forward or backward depending upon the direction of rotation of the bottom gear. Via the linked rod 84 and arms 86, the bottom gear of the rear gear box is rotated in the same direction as the bottom gear of the front gear box. The bottom gear of the rear gear box thus drives the associated gears 40, 42 in the same directions as the corresponding gears of the front gear box. Accordingly, the inner (front) ends of the rear arms 30, 32 are forced in the same directions as the inner (front) ends of the front arms 30, 32 because their torque arms are similarly torqued in opposite directions.

It will be understood that only the shaft 48 in the front gear box carries an arm 52 as shown in FIG. 4. Also, whereas the top gear 44 in the front gear box drives the gears 40, 42, 46, the top gear in the rear gear box is merely operated via the gears 40, 42 driven by the bottom gear 46. The top gear in the rear gear box may be eliminated, if desired. Also, the bottom gear in the front gear box may be eliminated when employing stabilizing means only for the front wheels.

This invention is not limited to the particular embodiment shown. For example, means separate from the stabilizing apparatus may be operated from the steering wheel to control steering of the front wheels. Also, this invention embraces the locating of the gear boxes and torque rods behind the associated sets of wheels, as well as their placement in front of the wheels in the manner shown. In the alternative arrangement, the arms 30, 32 extend forwardly from the torque rods to the wheels. In such case, the torque rods may be driven from the top gears 44 of the gear boxes. For such operation, the torque rods are provided with segment gears which mesh only with the top gears, and the top gears are connected by linkage as in the manner of the rod 84 and arms 86 above described.

We claim:

1. In a vehicle having a frame, front and rear pairs of road wheels, steering means operably connected to the front wheels, and a steering wheel, the wheels of each pair being disposed on opposite sides of the longitudinal axis of the frame, stabilizing means for operation by the steering wheel comprising:

first and second pairs of coaxial torque rods extending across said frame;
respective arms secured to the outer ends of said torque rods,
   each of said arms being attached to a respective one of said wheels;
first gear means coupling the inner ends of the rods of said first pair and operable by the steering wheel, including
   a first pair of spaced gears on a horizontal axis;
   a first shaft fixed to one and slidably extending through the other of said first pair of gears;
   a steering arm attached to said shaft and operably connected to said steering means;
   gears carried on the inner ends of said first pair of rods in mesh with a respective one of said first pair of gears;
   a first gear on a vertical axis operably coupled to the steering wheel and meshing with both gears of said pair;
a second gear means coupling the inner ends of the rods of said second pair, including
   a second pair of spaced gears on a horizontal axis;
   a second shaft fixed to one and slidably extending through the other of said second pair of gears;
   gears carried on the inner ends of said second pair of rods in mesh with a respective one of said second pair of gears;
   a second gear on a vertical axis meshing with both gears of said second pair;
and linkage means coupling the vertical axis gears of both gear means,
   said first and second gear means being operable so that when said steering wheel is turned, the torque rods and arms cooperate to tilt the frame inwardly.

2. The combination of claim 1, wherein each gear means includes a further gear on a vertical axis meshing with both horizontal axis gears;
   a respective arm fixed at one end to said further gears;
   and an elongated rod pivotally linked at its ends to the remaining ends of said gear-connected arms.

3. The combination of claim 2, wherein each torque rod has opposed segment gears meshing with respective ones of the associated horizontal axis gears.

* * * * *